United States Defensive Publication [19] (H) [11] T967,003

Witt et al. [43] Feb. 7, 1978

[54] FLOORING OF WOOD-PLASTIC COMPOSITE

[76] Inventors: Alvin E. Witt, 300 Steeplechase Drive, Media, Pa. 19063; Homer Breault, Pine Glen, Pa. 16845

[21] Appl. No.: 784,009

[22] Filed: Apr. 4, 1977

Related U.S. Application Data

[63] Continuation of Ser. No. 684,514, May 7, 1976, abandoned.

[51] Int. Cl.[2] ..... B32B 5/12; B32B 7/02; B32B 27/40

[52] U.S. Cl. ..... 428/113; 156/62.4; 428/213; 428/215; 428/218; 428/326; 428/378; 428/425; 428/537

[57] ABSTRACT

Wood is disintegrated to prepare a mass of wood fibers which are formed into a mat. A unique hardboard is prepared by compressing a preformed mat comprising thermoplastic resins, wood fibers and wood fibers coated with such resins. The hardboard has a resin content of from about 37% to about 39% and a wood fiber content from about 53% to about 57%. The moisture content of the hardboard is ordinarily within a range from about 4% to about 10%, but such moisture content has the range expected for wood products under a wide range of temperatures, humidities, pressures and related variables. The thickness of the hardboard must be within the range from 790 to 850 microns and the density of the hardboard must be within the range from 690 to 750 milligrams per cubic centimeter. Heretofore such hardboard has been proposed for use as a facing lamina in multilamina composites for covering up various irregularities in the surface of the adjacent lamina while preserving a smooth facing surface.

This hardboard having said 790 to 850 micron thickness is cut into tiles suitable for flooring and a plurality of tiles are directed through a coating zone in which an upper surface of each tile is coated with a precursor for a polyurethane. The thus coated tiles are advanced into a curing zone in which the coating is transformed into an attrition resistant polyurethane layer having a thickness which is within a range from about 110 to 300 microns, which corresponds to from about 1/7 to about $\frac{1}{3}$ of the thickness of the hardboard. Such curing zone suitable for the plastic can employ infrared, or ultraviolet, or equivalent radiation effective in promoting such polymerization to the polyurethane attrition resistant top layer of the multilaminar tile.

1 Claim, No Sheets Drawing,

15 Pages Specification

The file of this unexamined application may be inspected and copies thereof may be purchased (849 O.G. 1221, Apr. 9, 1968).